US007000564B2

(12) United States Patent
Franczyk

(10) Patent No.: US 7,000,564 B2
(45) Date of Patent: Feb. 21, 2006

(54) ICING SCULPTOR

(75) Inventor: Catherine Franczyk, Woodridge, IL (US)

(73) Assignee: Wilton Industries, Inc., Woodridge, IL (US)

( * ) Notice: Subject to any disclaimer, the term of this patent is extended or adjusted under 35 U.S.C. 154(b) by 69 days.

(21) Appl. No.: 10/422,480

(22) Filed: Apr. 24, 2003

(65) Prior Publication Data

US 2004/0212207 A1    Oct. 28, 2004

(51) Int. Cl.
 *B05C 11/04* (2006.01)
(52) U.S. Cl. .................. 118/13; 118/14; 15/236.05; 15/236.08; 15/245.1
(58) Field of Classification Search ............ 118/13–15; 15/235.4, 235.6, 235.8, 236.01, 236.05, 236.08, 15/236.09, 245.1; D7/649–652, 401.2; 99/494; 426/307; 83/932; 30/152, 162, 164, 286, 30/335, 344, 172, 329; 7/167; 81/491, 489, 81/487
See application file for complete search history.

(56) References Cited

U.S. PATENT DOCUMENTS

| 185,822 | A | | 1/1877 | Eveleth et al. | |
|---|---|---|---|---|---|
| 1,233,337 | A | | 7/1917 | Funk | |
| D169,837 | S | | 6/1953 | Blander | |
| 2,958,943 | A | * | 11/1960 | Koe, Jr. et al. | 30/115 |
| 3,166,776 | A | | 1/1965 | Selck | |
| 3,420,210 | A | * | 1/1969 | Lindquist | 118/18 |
| D221,244 | S | | 7/1971 | Lawrence | |
| 4,028,806 | A | * | 6/1977 | Sheldon | 30/290 |
| 4,266,501 | A | | 5/1981 | Knupp et al. | |
| 4,425,706 | A | | 1/1984 | Southworth et al. | |
| 4,455,752 | A | | 6/1984 | Koulouras | |
| D275,723 | S | * | 10/1984 | Leininger | D7/688 |
| 4,730,394 | A | * | 3/1988 | Sonner, Jr. | 30/161 |
| D297,494 | S | | 9/1988 | Derting, Jr. | |
| 4,967,477 | A | * | 11/1990 | Sanford | 30/315 |
| 5,209,779 | A | | 5/1993 | Talerico | |
| 5,585,123 | A | | 12/1996 | Busby | |
| D400,766 | S | | 11/1998 | Ferguson | |
| 6,010,170 | A | | 1/2000 | Fligg et al. | |

\* cited by examiner

*Primary Examiner*—Laura Edwards
(74) *Attorney, Agent, or Firm*—DLA Piper Rudnick Gray Cary US LLP

(57) ABSTRACT

A tool used to sculpt the icing on a baked good. The tool includes a handle having opposing inner sides with a channel formed in at least one inner side. The inner sides of the handle define a cavity therebetween. The tool also includes at least one blade with a protrusion that is sized and shaped to engage the channel in the inner side of the handle so that the blade is removably positioned within the handle cavity. The blade also includes decorative tips that extend from each end of the blade. The tool further includes a clip that secures the opposing sides of the handle together to form the tool.

16 Claims, 3 Drawing Sheets

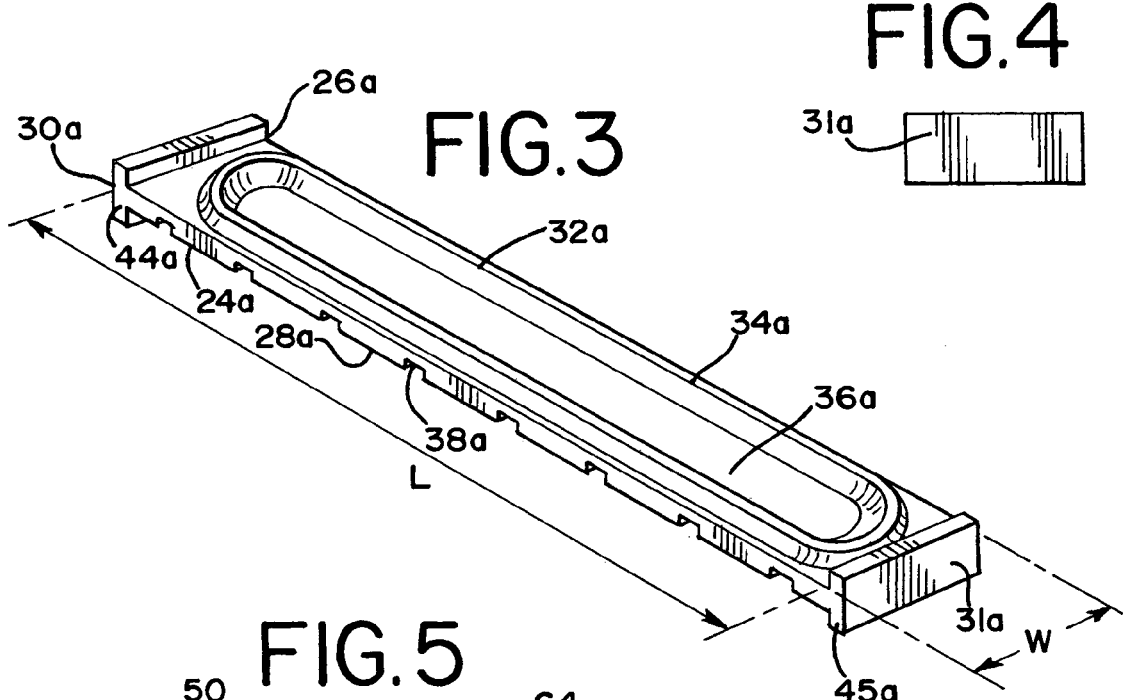
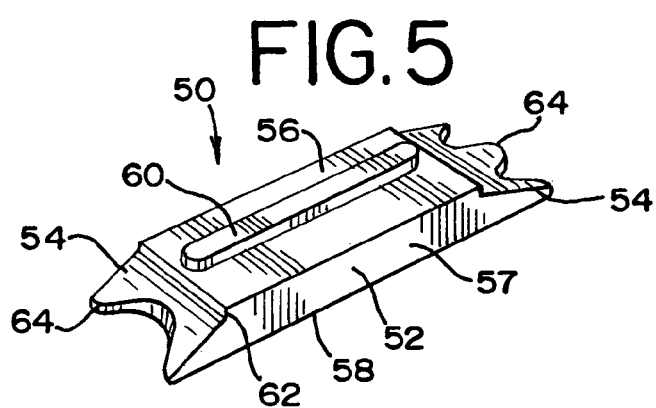
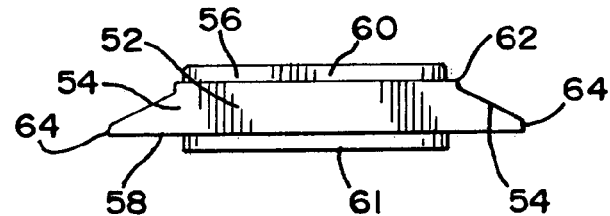
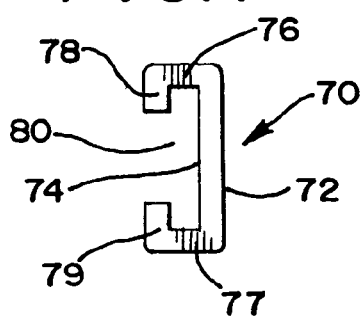
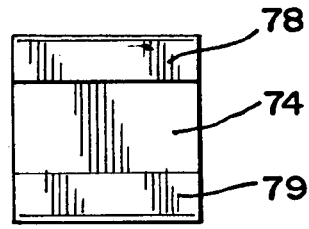

ICING SCULPTOR

TECHNICAL FIELD OF THE INVENTION

The present invention relates in general to a decorating device for food, and more particularly to a device for sculpting the icing that covers a cake or similar baked good.

BACKGROUND OF THE INVENTION

Tools used to decorate cakes or similar baked goods are well known in the art. Typically, a baked good, such as a cake, includes a layer of icing or frosting that covers the top surface and/or the side surfaces of the baked good. It is often desirable to decorate the cake with a specific design, typically when the cake is for a specific occasion.

An example of a prior art icing tool is presented in U.S. Des. Pat. No. 275,723 issued to Leininger. The Leininger '723 patent illustrates a one piece cake decorating tool having a separate design pattern molded on opposing edges. A user grasps the tool in their hand and spreads it through the icing to decorate a cake. The decorating tool is limited, however, in the design patterns that may be formed on the cake since the tool has molded decorative edges.

Another example of an icing tool is illustrated in U.S. Pat. No. 5,209,779 issued to Talerico. The Talerico patent illustrates a hand held icing spreader having a plurality of tines that are dipped into a container of icing. The hand held spreader is then held over the baked good so that the icing drips off the spreader on to the baked good thereby providing a decoration on the baked good. The icing spreader, however, is not a simple decorating tool for uniformly and consistently applying the icing to the baked good or sculpting the icing on a baked good. Also, the hand held icing spreader is designed to enable the user to applied a design in the icing only to the top surface of the baked good.

Therefore, it is an object of the present invention to provide an icing sculptor that enables a user to create a consistent decorative pattern on an iced baked good.

It is another object of the present invention to provide an icing sculptor that is easy to use.

It is another object of the present invention to provide an icing sculptor that is economical to produce.

It is yet another object of the invention to provide an icing sculptor that enables the user to decorate the top and sides of a baked good in a variety of patterns.

SUMMARY OF THE INVENTION

The present invention is directed to a tool for sculpting icing on a baked good. The tool includes a handle with opposing inner sides, a channel formed in at least one of the inner sides and ends that have an outwardly extending flange. The opposing inner sides of the handle define a cavity therebetween. The tool also includes at least one blade that has an extending protrusion sized and shaped to engage the channel formed in the inner side of the handle. The blade is removably positioned within the handle cavity. The blade has a main body with two ends and a decorative tip extending from each end. The tool further includes at least one clip that is used to secure the opposing sides together. The clip has a recess that receives the outwardly extending flanges of the handle ends.

BRIEF DESCRIPTION OF THE DRAWINGS

Further aspects of the invention and their advantages may be discerned from the following description when taken in conjunction with the drawings, in which like characters number like parts and in which:

FIG. 3 is a perspective view of one of the members that form the handle of the icing sculptor illustrated in FIG. 1.

FIG. 4 is a side elevational view of the handle of the icing sculptor illustrated in FIG. 3.

FIG. 5 is a perspective view of a blade of the icing sculptor illustrated in FIG. 1.

FIG. 6 is a side elevational view of the blade of the icing sculptor illustrated in FIG. 5.

FIG. 7 is a front elevational view of the clip illustrated in FIG. 1.

FIG. 8 is a side elevational view of the clip illustrated in FIG. 7.

DETAILED DESCRIPTION

Figure 1:
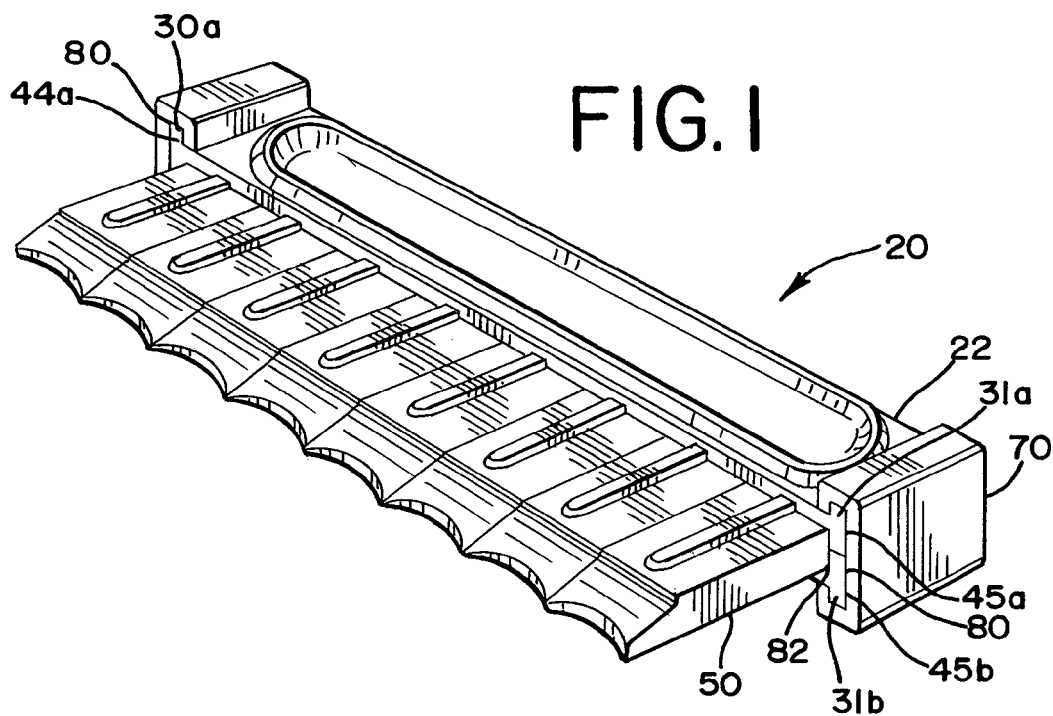
FIG. 1 is a perspective view of an embodiment of the icing sculptor of the present invention.

An embodiment of the icing sculptor of the present invention is indicated in general at 20 in FIG. 1. The icing sculptor is a hand-held tool having a handle 22 and a plurality of blades 50 extending outwardly therefrom. As illustrated in FIG. 1, the blades extend from one side of the handle. The blades are aligned such that each blade extends the same distance. As discussed below, the aligned blades enable the blade tips to produce a consistent decorative pattern on a baked good.

Figure 2:
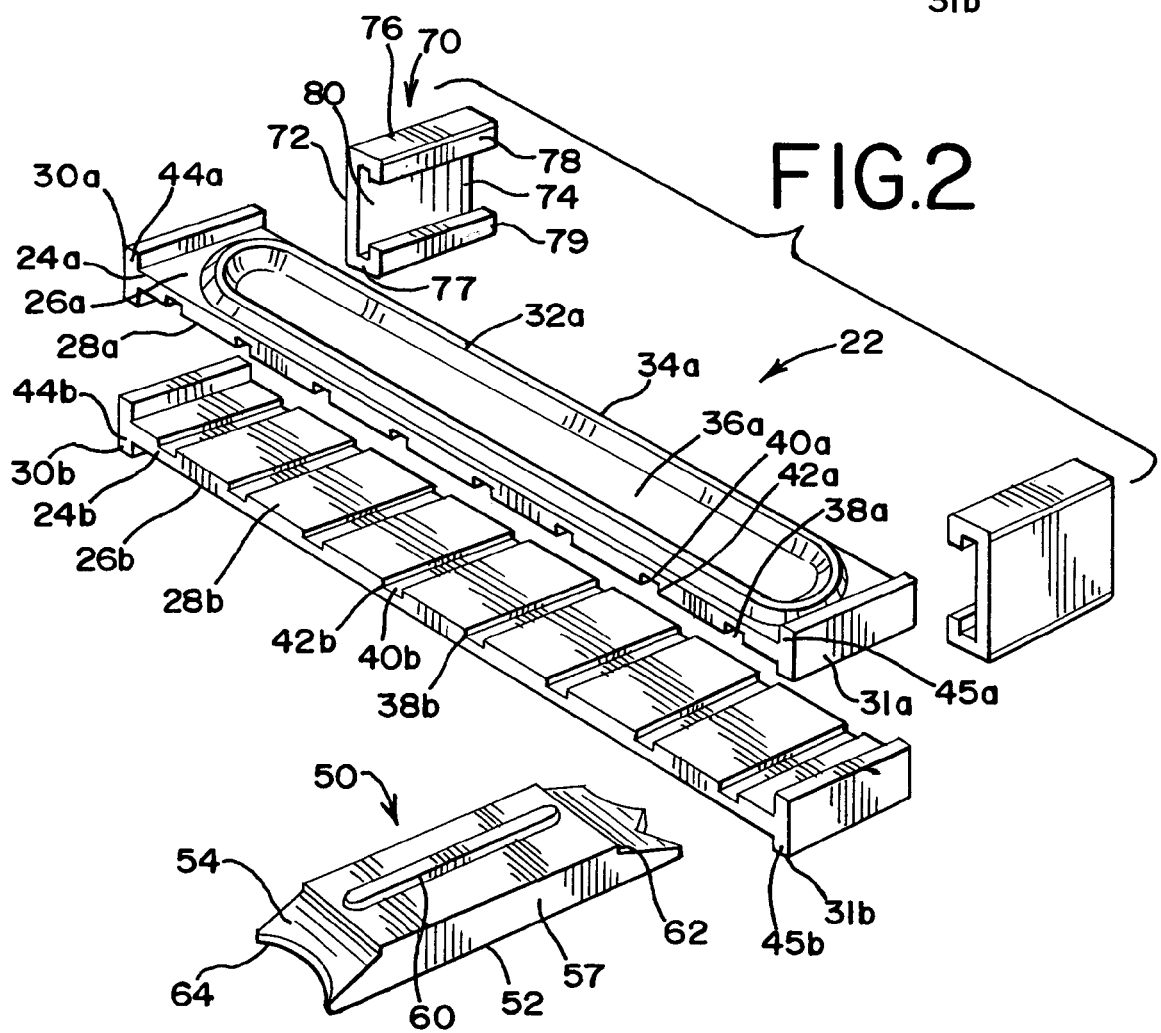
FIG. 2 is a perspective exploded view of the icing sculptor illustrated in FIG. 1.

As illustrated in FIG. 2, the handle, indicated in general at 22, is formed from two elongated pieces 24*a* and 24*b* that are disposed adjacent each other when the sculptor is assembled. The elongated pieces 24*a* and 24*b* that form the handle 22 of the icing sculptor are identical and are preferably formed from a plastic. As illustrated in FIGS. 2 and 3, each elongated piece includes an outer surface 26*a* and 26*b*, an inner surface 28*a* and 28*b* and two ends 30*a* and 30*b* and 31*a* and 31*b*.

The outer surface 26*a* and 26*b* of each elongated piece 24*a* and 24*b* includes an oblong shaped projection 32*a* and 32*b* that is centered on each elongated piece 24*a* and 24*b*. The oblong shaped projections 32*a* and 32*b* include an oblong shaped outer rim 34*a* and 34*b* which curves downwardly to a flat center portion 36*a* and 36*b*. The oblong shaped projections 32*a* and 32*b* preferably extend a majority of the length L and width W (FIG. 3) of each respective elongated piece 24*a* and 24*b*. This arrangement enables the user to hold the handle by placing their fingers on the center portion. As a result, the user can comfortably grasp the handle while icing a baked good. Additionally, the projection affords the user the ability to smoothly control the handle when sculpting the icing of a baked good.

As illustrated in FIG. 2, the inner surface 28*a* and 28*b* of each elongated piece 24*a* and 24*b* includes a plurality of channels 38*a* and 38*b* that extend the width W of each elongated piece 24*a* and 24*b*. Each channel 38*a* and 38*b* has a bottom 40*a* and 40*b* and two sides 42*a* and 42*b* that extend from the bottom 40*a* and 40*b* thereby forming a generally "C" shaped channel 38*a* and 38*b*. However, as discussed below with respect to the blade 50, the channels 38*a* and 38*b* may have various shapes. In the illustrated embodiment, each elongated piece 24*a* and 24*b* includes eight identical channels 38*a* and 38*b* that are spaced equidistant from each other. The number of channels and the spacing between each channel may also vary depending on the decoration that is desired for the baked good and the decorative blades used to create the decoration.

FIGS. 2–4 illustrate the ends 30*a*, 30*b* and 31*a*, 31*b* of each elongated piece 24*a* and 24*b*. The ends 30*a*, 30*b* and 31*a*, 31*b* include a generally T-shaped flange 44*a*, 44*b* and 45*a*, 45*b* that extends from each elongated piece 24*a* and 24*b*. As illustrated in FIGS. 2 and 3, half of each "T" shaped flange 44*a*, 44*b* and 45*a*, 45*b* extends above the outer surface 26*a* and 26*b* of each elongated piece 24*a* and 24*b* and the remaining half of the "T" shaped flange 44*a*, 44*b* and 45*a*, 45*b* extends below the inner surface 28*a* and 28*b* of each elongated piece 24*a* and 24*b*.

FIG. 5 illustrates one of the blades, indicated in general at 50, that is designed to be installed in the handle 22 of the present invention. The blade 50 includes a main body 52 with a tip 54 that extends from each end. As illustrated in FIGS. 5 and 6, the main body 52 includes a top surface 56 and a bottom surface 58. Both the top surface 56 and the bottom surface 58 of the main body 52 each include an outwardly extending protrusion 60 and 61, respectively. The protrusions 60 and 61 are generally rectangular with rounded or semi-circular ends. The shape of each protrusion 60 and 61, however, may vary as long as it is has a shape that matingly corresponds to the shape of the channels 38*a* and 38*b* in each elongated piece 24*a* and 24*b*.

As shown in FIG. 6, the top half of the main body 52 of the blade 50 includes a step 62. The step 62 is located at each end of the main body 52. One of the tips 54 begins at the bottom of each step 62. The tips 54 are angled downward from the step 62 until the tip has reached the horizontal plane within which the bottom surface 58 of the blade 50 is disposed. As described below, the step 62 helps the user guide the blades 50 into the channels 38*a* and 38*b* in the elongated pieces 24*a* and 24*b* when the user installs the blades 50 in the handle 22 to form the icing sculptor.

The angled tips 54 facilitate the process of sculpting the icing on a baked good. The outer edge 64 of each angled tip 54 includes a specific sculpting edge design. The designs of the outer edge 64 vary so that the user has a variety of options for decorating their baked good. For example, as illustrated in FIG. 9, the outer edge 64 of the tip 54 may have a design that includes a curve 100, a wave 102 or other various shapes.

FIGS. 7–8 illustrate the clip, indicated in general at 70, that secures the elongated pieces 24*a* and 24*b* to each other. The clip 70 is generally "C" shaped with an outer surface 72, inner surface 74, two legs 76, 77 and two inwardly turned flanges 78, 79 that form the "C" shape. A recess 80 is formed between the inner surface 74 and the inwardly turned flanges 78, 79. As illustrated in FIG. 1, the recess 80 receives a portion of the "T" shaped flanges 44*a*, 44*b* and 45*a*, 45*b* that form the ends 30*a*, 30*b* and 31*a*, 31*b* of each elongated piece 24*a* and 24*b*.

Figure 9:
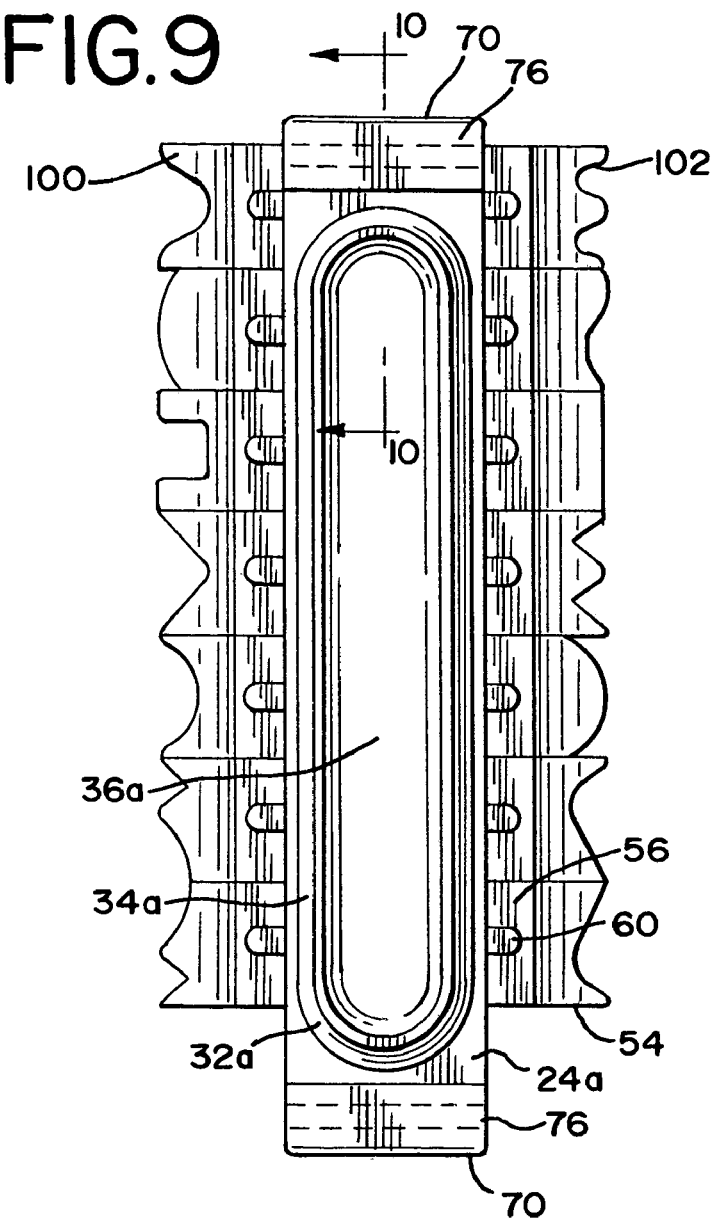
FIG. 9 is a top plan elevational view of the icing sculptor with the blades centered in the middle of the handle such that the blades extend from each side of the handle.

The assembled icing sculptor of the present invention is illustrated in FIGS. 1 and 9. As shown in FIG. 1, the blades may be positioned within the handle such that the blade tips only extend from one side of the elongated pieces that form the handle. Alternatively, as shown in FIG. 9, the blade tips may extend from either side of the elongated pieces that form the handle. The spaced apart channels in the inner surface of the elongated pieces align the blade tips in the handle such that the user is able to create a pattern on the baked good that is consistent.

Figure 10:
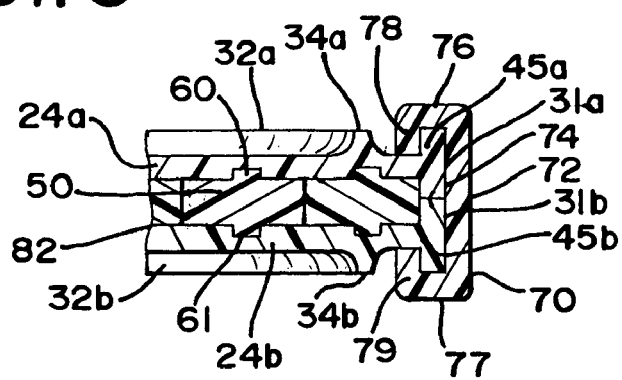
FIG. 10 is a cross sectional view of the icing sculptor taken along line 10—10 of FIG. 9.

To assemble the icing sculptor of FIGS. 1 and 9, the user positions the two elongated pieces 24*a*, 24*b* so that the inner surface 28*a* of one elongated piece 24*a* faces the inner surface 28*b* of the second elongated piece 24*b*, as illustrated in FIG. 2. The user also aligns the two elongated pieces 24*a* and 24*b* so that when the elongated pieces 24*a* and 24*b* are positioned adjacent each other the channels 38*a* and 38*b* formed in the inner surface 28*a* and 28*b* of each of the elongated pieces 24*a* and 24*b* are aligned. When the elongated pieces 24*a* and 24*b* are positioned adjacent each other, the "T" shaped flanges 44*a*, 44*b* and 45*a*, 45*b* at each end of the elongated pieces 24*a* and 24*b* are positioned on top of each other thereby forming a cavity 82 between each elongated piece 24*a* and 24*b*. A clip 70 is slid over the adjacent "T" shaped flanges 44*a*, 44*b* and 45*a*, 45*b* at the ends 30*a*, 30*b* and 31*a*, 31*b* of each elongated piece 24*a* and 24*b*. As shown in FIGS. 1 and 10, the recess 80 of the "C" shaped clip 70 receives one set of the "T" shaped flanges 44*a*, 44*b* and 45*a*, 45*b* of the elongated pieces 24*a* and 24*b*. As a result, the clip 70 secures the elongated pieces 24*a* and 24*b* together.

The user may then select a number of blades to be installed in the handle to form a sculpting tool that will provide the desired decoration. Depending on the size of the baked good, the user may insert between one and eight blade(s) 50 in the cavity 82 between the elongated pieces 24*a* and 24*b*. More specifically, the user positions the blade 50 such that the top surface 56, the step 62 and the angled tips 54 are facing upwards. Next, the user aligns the protrusions 60 and 61 that extend from the top surface 56 and bottom surface 58 of the blade 50, respectively, with one of the channels 38*a* and 38*b* in the elongated pieces 24*a* and 24*b*. The blade 50 is slid into the cavity 82 between the elongated pieces 24*a* and 24*b* with the protrusions 60 and 61 positioned in the channels 38*a* and 38*b* in the inner surface 28*a* and 28*b* of one of the elongated pieces 24*a* and 24*b*. FIG. 10 illustrates the protrusions 60 and 61 of the blades 50 disposed in the channels 38*a* and 38*b* in the inner surface 28*a* and 28*b* of the elongated pieces 24*a* and 24*b* such that the channels 38*a* and 38*b* matingly engage the protrusions 60 and 61. The channels 38*a* and 38*b* are spaced so that the sides 57 of adjacent blades contact each other when positioned in the handle.

It should be noted that the positions of the channels in the handle and protrusions extending from the blade may be reversed from the positions shown in the figures. More specifically, the inner surface of the elongated pieces may include a number of outwardly extending protrusions and the top and bottom surfaces of the blade may include a number of channels. To assemble the icing sculptor with this arrangement, the channels in the top and bottom surface of the blades would be aligned with the protrusions extending from the inner surface of the elongated pieces.

To complete the assembly, the user may adjust the position of the blades within the channel such that the tip extends only from one side of the elongated pieces of the handle, as shown in FIG. 1, or the user may slid the blades within the channel such that a tip extends from each side of the elongated pieces of the handle, as shown in FIG. 9. The user repeats this process until all of the blades required to form the desired decoration have been installed.

After the blades are slid into the cavity between the elongated pieces, the icing sculptor is ready for use. The user may use the icing sculptor on any type of baked good that has a layer of icing that is preferably about a ½ inch thick. This thick layer of icing provides a uniform surface that is capable of being formed into a decoration. Additionally, the baked good is preferably placed on a board or a similar flat surface that is less than one inch larger than the baked good to ensure that the blades reach the entire surface of the baked good.

Before using the icing sculptor on the baked good, the user will typically preview the design they created to ensure that the design is satisfactory. In order to preview the design, the user spreads some icing on a board or similar flat material and glides the icing sculptor over the iced area. If the preview design is inconsistent or inaccurate, the user may change or adjust the blades until the design has been perfected.

To use the icing sculptor on a baked good, such as a cake, the user holds the icing sculptor at a generally 45 degree angle towards the surface of the cake. The user does not need to press the blade tips into the icing on the cake. Instead, the user merely glides the blade tips of the icing sculptor over the icing of the cake. If the user wants to decorate the side of the cake, they would preferably place the cake on a turntable. The user would then hold the icing sculptor to the side of the cake and turn the turntable. As a result, the user may sculpt the side of the cake in one fluid motion. This would ensure that the sculpting design around the cake is consistent.

It may also be desirable to create a vertical design instead of a horizontal design on the side of the cake. To create a vertical design, it is preferable to assemble, at the maximum, only five blades in the handle. The user would apply one set of vertical lines. To ensure a smooth design, the tips of the blade are typically wiped clean after each stroke through the icing. After applying the first set of vertical lines and wiping the blades clean, the user would line up the icing sculptor with the sculpted design so that the second set of vertical lines is consistent with the first set of vertical lines. This process continues until the entire side of the cake has been decorated.

The present invention thus provides a versatile tool for decorating baked goods, such as a cake. The design options are numerous since the user may arrange the tip designs to create a variety of patterns. As such, the user is capable of customizing their decoration for the baked good.

While the preferred embodiments of the invention have been shown and described, it will be apparent to those skilled in the art that changes and modifications may be made therein without departing from the spirit of the invention, the scope of which is defined by the appended claims.

What is claimed is:

1. A tool for sculpting icing on a baked good, the tool comprising:
    a handle having outer sides and ends, wherein the ends have an outwardly extending flange, and opposing inner sides defining a cavity with a channel formed in at least one of the inner sides;
    at least one blade adapted to sculpt icing; and
    said at least one blade having an extending protrusion sized and shaped to engage the channel of the handle so that the blade is removably positioned in the handle cavity.

2. The tool of claim 1, wherein a plurality of channels are formed in the inner sides, the plurality of channels extend a width of each of the inner sides.

3. The tool of claim 1, wherein the protrusion extends from a top and bottom surface of the blade.

4. The tool of claim 1, further comprising a clip, the clip having a recess for receiving the outwardly extending flanges of the handle.

5. A tool for sculpting icing on a baked good, the tool comprising:
    a handle having outer sides and ends and opposing inner sides defining a cavity with a channel formed in at least one of the inner sides;
    at least one blade adapted to sculpt icing;
    said at least one blade having an extending protrusion sized and shaped to engage the channel of the handle so that the blade is removably positioned in the handle cavity; and
    a clip having a recess for receiving the ends of the handle.

6. A tool for sculpting icing on a baked good, the tool comprising:
    a handle having outer sides and ends and opposing inner sides defining a cavity with a channel formed in at least one of the inner sides;
    at least one blade adapted to sculpt icing;
    said at least one blade having an extending protrusion sized and shaped to engage the channel of the handle so that the blade is removably positioned in the handle cavity; and
    the outer sides of the handle having a projection for accommodating a user's hand while using the tool wherein the projection includes an oblong rim that curves downward toward a flat center portion.

7. A tool for sculpting icing on a baked good, the tool comprising:
    a handle having outer sides, opposing inner sides, and ends defining a cavity therebetween with a channel formed in at least one of the inner sides;
    at least one blade adapted to sculpt icing;
    said at least one blade having an extending protrusion sized and shaped to engage the channel of the handle so that the blade is removably positioned in the handle cavity; and
    the at least one blade having a main body with two ends and a decorative tip extending from each end.

8. The tool of claim 7, wherein the main body of the blade has a step portion for facilitating insertion in the handle cavity.

9. The tool of claim 7, wherein the blade tips are angled for aiding in sculpting a design in the icing.

10. A tool for decorating icing on a baked good, the tool comprising:
    a handle having two joinable members having opposing outer sides, opposing inner sides, and ends with a cavity formed therebetween;
    at least one blade removably positioned within the cavity of the handle, the at least one blade having a main body and two ends with decorative tips and a top surface and a bottom surface; and
    at least one protrusion extending from one of the top surface and the bottom surface of the at least one blade, wherein the protrusion engages the handle to secure the blade to the handle.

11. The tool of claim 10, wherein the decorative tips are angled for aiding in sculpting a design in the icing.

12. A tool for decorating icing on a baked good, the tool comprising:
    a handle having two joinable members having opposing outer sides, opposing inner sides, and ends with a cavity formed therebetween;

at least one blade removably positioned within the cavity of the handle, the at least one blade having a top surface and a bottom surface; and at least one protrusion extending from one of the top surface and the bottom surface of the at least one blade, wherein the protrusion engages the handle to secure the blade to the handle; and wherein each member has an inner surface and an outer surface, the inner surface having a plurality of channels formed therein.

13. The tool of claim 12, wherein the protrusion extending from one of the top and the bottom surface of the blade is received in one of the channels of the members.

14. The tools of claim 12, wherein the outer surface of each member has a projection for accommodating a user's hand while using the tool, wherein the projection includes an oblong rim that curves downward toward a flat center portion.

15. A tool for decorating icing on a baked good, the tool comprising:

a handle having two joinable members having opposing outer sides, opposing inner sides, and ends with a cavity formed therebetween;

at least one blade removably positioned within the cavity of the handle, the at least one blade having a top surface and a bottom surface;

at least one protrusion extending from one of the top surface and the bottom surface of the at least one blade, wherein the protrusion engages the handle to secure the blade to the handle; and wherein each member has two ends, the ends having an outwardly extending flange.

16. A tool for decorating icing on a baked good, the tool comprising:

a handle having two joinable members having opposing outer sides, opposing inner sides, and ends with a cavity formed therebetween;

at least one blade removably positioned within the cavity of the handle, the at least one blade having a top surface and a bottom surface;

at least one protrusion extending from one of the top surface and the bottom surface of the at least one blade, wherein the protrusion engages the handle to secure the blade to the handle; and a clip for securing the members together, the clip having a recess for receiving outwardly extending flanges of the ends of each member.

* * * * *